United States Patent
Oota (10) Patent No.: US 8,294,902 B2
(45) Date of Patent: Oct. 23, 2012

(54) MEASURING METHOD AND MEASURING DEVICE FOR MEASURING A SHAPE OF A MEASUREMENT SURFACE USING A REFERENCE STANDARD FOR CALIBRATION

(75) Inventor: Tetsuji Oota, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 475 days.

(21) Appl. No.: 12/551,720

(22) Filed: Sep. 1, 2009

(65) Prior Publication Data

US 2010/0053630 A1 Mar. 4, 2010

(30) Foreign Application Priority Data

Sep. 2, 2008 (JP) ................................. 2008-224650

(51) Int. Cl.
*G01B 11/02* (2006.01)
(52) U.S. Cl. ....................................................... 356/511
(58) Field of Classification Search .................. 356/489, 356/495, 511–515, 521
See application file for complete search history.

(56) References Cited

U.S. PATENT DOCUMENTS

| | | | |
|---|---|---|---|
| 5,982,490 A * | 11/1999 | Ichikawa et al. | 356/512 |
| 6,100,980 A * | 8/2000 | Ichikawa | 356/511 |
| 6,184,994 B1 * | 2/2001 | Freischlad | 356/511 |
| 6,344,898 B1 * | 2/2002 | Gemma et al. | 356/513 |
| 2002/0080366 A1 * | 6/2002 | Nakayama | 356/512 |
| 2004/0036890 A1 | 2/2004 | Nakayama | |

FOREIGN PATENT DOCUMENTS

JP  2002-213930  7/2002

* cited by examiner

*Primary Examiner* — Hwa Lee
(74) *Attorney, Agent, or Firm* — Canon U.S.A., Inc. IP Division (57) ABSTRACT

The present invention provides a reference standard used to calibrate measurement data of a measuring device for measuring the shape of a measurement surface utilizing interference between light from the measurement surface and light from the reference surface. A measurement surface of the reference standard has at least one protruding mark and one recessed mark, and an integrated value of the dimension of the protruding mark in the direction normal to the measurement surface of the reference standard, on the circumference of an assumed circle on the measurement surface centered at a point on an optical axis of the reference standard, is equal to an integrated value of the dimension of the recessed mark in the direction normal to the measurement surface of the reference standard on the circumference of the assumed circle.

6 Claims, 7 Drawing Sheets

⊘ MEASURED POSITIONS MD
○ TRUE COORDINATES OF MARKS MR

MEASURING METHOD AND MEASURING DEVICE FOR MEASURING A SHAPE OF A MEASUREMENT SURFACE USING A REFERENCE STANDARD FOR CALIBRATION

BACKGROUND OF THE INVENTION

1. Field of the Invention

The present invention generally relates to measuring methods, methods for manufacturing optical elements, reference standards, and measuring devices.

2. Description of the Related Art

Interferometers are used to measure the shape of the surfaces of optical elements, such as lenses and mirrors. Such an interferometer obtains data on the shape of a measurement surface by emitting a measuring beam onto the measurement surface of an optical element (measurement object) and a reference surface and measuring the difference in position between them as interference fringes. Because the interferometer use light, it has higher measuring accuracy than measuring devices employing other measuring methods, such as contact type measuring devices.

The result of measurement by the interferometer contains measurement errors of the interferometer itself in addition to the data on the shape of the measurement surface. Thus, by calibrating the measurement data of the interferometer with the measurement error, the data on the shape of the measurement surface can be obtained. The measurement errors are classified into a measurement error in the direction normal to the measurement surface (system error) and a measurement error in the direction tangent to the measurement surface (distortion). The direction normal to the measurement surface means the normal direction at each point in the measurement surface. When the measurement surface is curved, the normal direction is determined corresponding to each point in the curved surface. Similarly, the direction tangent to the measurement surface means the tangent direction at each point in the measurement surface.

Japanese Patent Laid-Open No. 2002-213930 (U.S. Patent Laid-Open No. 2004/36890) discloses a method for calibrating a system error in which a plurality of measurement data are obtained by rotating a reference standard having substantially the same shape as a measurement surface and arithmetic processing is performed using the data. As will be described below, in the invention disclosed therein, the system error is determined by subtracting a rotationally asymmetric component and rotationally symmetric component of the shape data of the reference standard from the measurement data. Therefore, by calibrating the measurement data of the measuring device with the system error, the data on the shape of the measurement surface can be obtained. However, with this method, only the measurement error in the direction normal to the measurement surface can be determined, and the measurement error in the direction tangent to the measurement surface (distortion) cannot be determined.

On the other hand, Japanese Patent Laid-Open No. 2002-333305 discloses a method for calibrating distortion. More specifically, it discloses forming marks, serving as light-shielding portions, at specific coordinates on the optically effective area of a reference standard. From the measured coordinates of the marks and the true coordinates of the marks, the distortion of the measuring device is determined and calibrated.

As described above, a reference standard having marks is used only for calibration of distortion. Therefore, to calibrate a system error, a reference standard having no marks is needed. This increases the manufacturing costs. In addition, because the calibrations of the system error and distortion of the interferometer have to be performed in separate steps, the cycle time of a measurement sequence increases.

SUMMARY OF THE INVENTION

The present invention provides a measuring method and a measuring device capable of accurately measuring the shape of a measurement surface using fewer reference standards for calibrating a measurement error, a reference standard for calibration, and a method for manufacturing an optical element on the basis of the measurement.

The present invention in its first aspect provides a method for measuring the shape of a measurement surface using a measuring device for measuring the shape of the measurement surface utilizing interference between light from the measurement surface and light from a reference surface. The method includes: a step of obtaining data on a rotationally symmetric component of the shape of a measurement surface of a reference standard having a mark; a reference standard measuring step of measuring the measurement surface of the reference standard several times at different rotation angles about the optical axis of the reference standard by the measuring device; a calculation step of calculating a measurement error of the measuring device in a direction normal to the measurement surface by calculating a rotationally asymmetric component of the shape of the measurement surface of the reference standard using the measurement data corresponding to the respective rotation angles obtained in the reference standard measuring step and by subtracting the rotationally symmetric component and the rotationally asymmetric component from the measurement data corresponding to the respective rotation angles; a calculation step of calculating a measurement error of the measuring device in a direction tangent to the measurement surface using data on the position of the mark contained in the measurement data corresponding to the respective rotation angles obtained in the reference standard measuring step; a measurement object measuring step of measuring a measurement surface of a measurement object by the measuring device; and a step of calibrating the measurement data of the measurement surface of the measurement object obtained in the measurement object measuring step using the measurement errors calculated in the calculation steps.

The present invention in its second aspect provides a method for measuring the shape of a measurement surface using a measuring device for measuring the shape of the measurement surface utilizing interference between light from the measurement surface and light from a reference surface. The method includes: a step of obtaining data on a rotationally symmetric component of the shape of a measurement surface of a reference standard having a mark; a reference standard data obtaining step of obtaining measurement data obtained by measuring the measurement surface of the reference standard several times at different rotation angles about the optical axis of the reference standard by the measuring device; a calculation step of calculating a measurement error of the measuring device in a direction normal to the measurement surface by calculating a rotationally asymmetric component of the shape of the measurement surface of the reference standard using the measurement data corresponding to the respective rotation angles obtained in the reference standard data obtaining step and by subtracting the rotationally symmetric component and the rotationally asymmetric component from the measurement data corresponding to the respective rotation angles; a calculation step of calculating a measurement error of the measuring device in a direction tangent to the measurement surface using data on the position of the mark contained in the measurement data corresponding to the respective rotation angles obtained in the reference standard data obtaining step; and a step of calibrating measurement data of a measurement surface of a measurement object measured by the measuring device using the measurement errors calculated in the calculation steps.

The present invention in its third aspect provides a reference standard used to calibrate measurement data of a measuring device for measuring the shape of a measurement surface utilizing interference between light from the measurement surface and light from the reference surface. A measurement surface of the reference standard has at least one protruding mark and one recessed mark. An integrated value of the dimension of the protruding mark in the direction normal to the measurement surface of the reference standard, on the circumference of an assumed circle on the measurement surface centered at a point on an optical axis of the reference standard, is equal to an integrated value of the dimension of the recessed mark in the direction normal to the measurement surface of the reference standard on the circumference of the assumed circle.

The present invention in its fourth aspect provides A measuring device for measuring the shape of a measurement surface utilizing interference between light from the measurement surface and light from a reference surface. The measuring device includes a storage unit arranged to store an integrated value of the dimension of a mark in the direction normal to a measurement surface of a reference standard on the circumference of an assumed circle on the measurement surface centered at a point on an optical axis of the reference standard used to calibrate measurement data of the measuring device and having the mark on the measurement surface.

The present invention in its fifth aspect provides a measuring device for measuring the shape of a measurement surface utilizing interference between light from the measurement surface and light from a reference surface. The measuring device includes: a storage unit arranged to store data on a rotationally symmetric component of the shape of a measurement surface of a reference standard having a mark; a measuring unit arranged to measure the measurement surface of the reference standard several times at different rotation angles about the optical axis of the reference standard by the measuring device and arranged to measure a measurement surface of a measurement object by the measuring device; a calculation unit arranged to calculate a measurement error of the measuring device in the direction normal to the measurement surface by calculating a rotationally asymmetric component of the measurement surface of the reference standard using the measurement data corresponding to the respective rotation angles obtained by the measuring unit and subtracting the rotationally asymmetric component and the rotationally symmetric component from the measurement data corresponding to the respective rotation angles, and arranged to calculate the measurement error of the measuring device in the direction tangent to the measurement surface using data on the position of the mark contained in the measurement data corresponding to the respective rotation angles; and a calibration unit arranged to calibrate the measurement data of the measurement surface of the measurement object using the measurement errors calculated by the calculation unit.

Further features of the present invention will become apparent from the following description of exemplary embodiments with reference to the attached drawings.

DESCRIPTION OF THE EMBODIMENTS

Embodiments of the present invention will now be described in detail in accordance with the accompanying drawings.

First Embodiment

Figure 1:
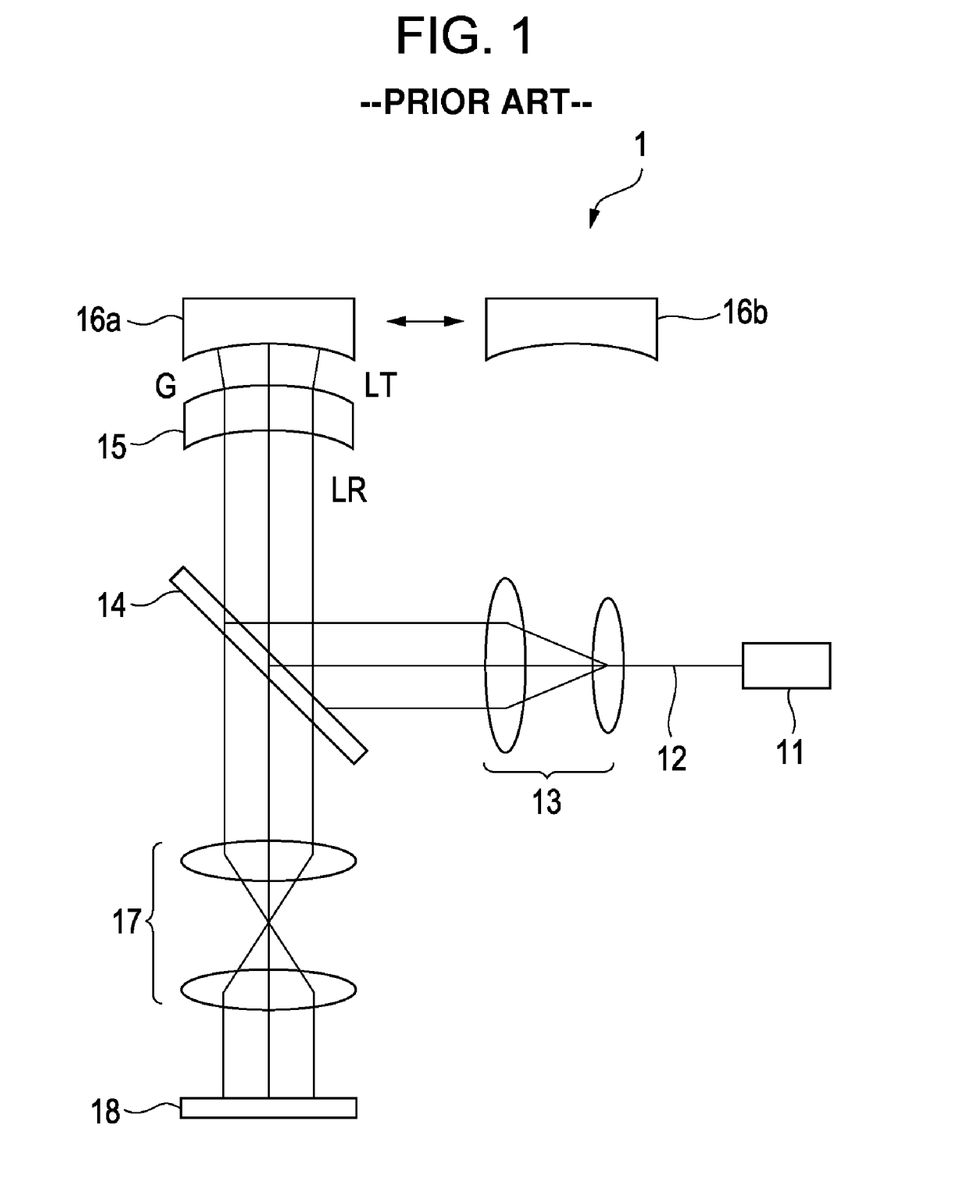
FIG. 1 is a schematic view of a Fizeau interferometer.

A first embodiment of the invention will be described below. FIG. 1 is a schematic view of a Fizeau interferometer 1, which is a measuring device for measuring the surface shape of a measurement object. A measuring beam L emitted from a light source 11 is incident on a fiber 12. The measuring beam L converted into desired parallel beams by an optical system 13 is reflected at a half mirror 14 and is incident on a Fizeau lens (reference lens) 15 having a Fizeau surface (reference surface). The measuring beam L is split at the reference surface into reflected light LR and transmitting light LT. The transmitting light LT is reflected by a measurement element 16a, which is a measurement object, disposed at a Fizeau gap G from the reference surface of the optical element 15. Then, the reflected light LR and the transmitting light LT return along the same optical path, pass through the half mirror 14, and form interference fringes on an image pick-up surface of a charge-coupled device (CCD) 18 via an optical system 17. The CCD 18 measures the distribution of light intensity of the interference fringes.

The light source 11 may be either a single-wavelength laser, such as argon ion laser, or multiple-wavelength laser. In the case of the multiple-wavelength laser, it is desirable to provide a structure for changing the polarization state of the multiple-wavelength laser for the respective wavelengths. It is desirable that the optical system 17 include a structure for separating the multiple-wavelength laser according to the polarization state, for example, a beam splitter, and the CCD 18 include a structure that can separately measure the multiple wavelengths.

It is desirable that the gap G between the reference surface of the optical element 15 and the measurement surface of the measurement element 16a be substantially uniform. Furthermore, it is desirable that the reference surface be designed to allow the transmitting light LT having passed through the gap G to be incident substantially perpendicularly on the measurement surface of the measurement element 16a and to return along substantially the same optical path.

Although, in this embodiment, the measurement surface of the measurement element 16a is an aspherical surface that is rotationally symmetric about the optical axis, it is not limited thereto.

Before the surface shape of the measurement element 16*a* is measured, the system error and distortion of the Fizeau interferometer 1 have to be calibrated. For that purpose, instead of the measurement element 16*a*, a reference standard 16*b* is disposed at the measurement position to be measured. Except for the measurement element 16*a* and the reference standard 16*b*, the structure of the Fizeau interferometer 1 is the same in both cases where the measurement element 16*a* is disposed at the measurement position to be measured and where the reference standard 16*b* is disposed at the measurement position to be measured.

The structures of the reference standard 16*b* will now be described. FIGS. 2A to 2D show the structures of the reference standard 16*b*. In the measurement area of the measurement surface of the reference standard 16*b*, at least one mark M having predetermined three-dimensional shape and coordinate in the measurement surface is formed. Herein, the "three-dimensional shape" includes the shape in the direction normal to the measurement surface and the shape in the direction tangent to (in the in-plane direction of) the measurement surface.

Figure 2A:
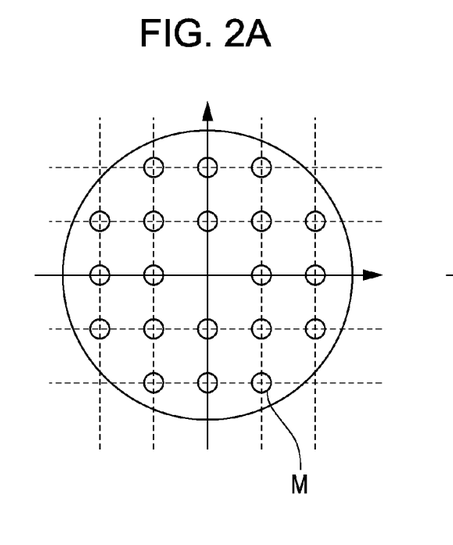
FIGS. 2A to 2D are diagrams showing reference standards according to a first embodiment.
Figure 2B:
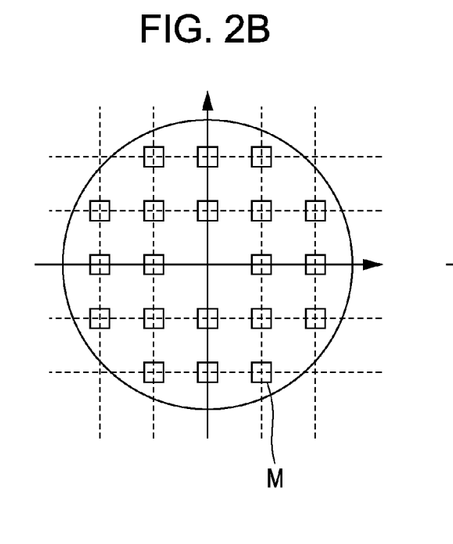
Figure 2C:
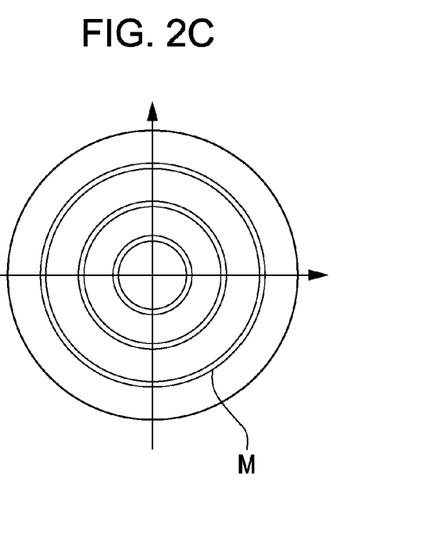
Figure 2D:
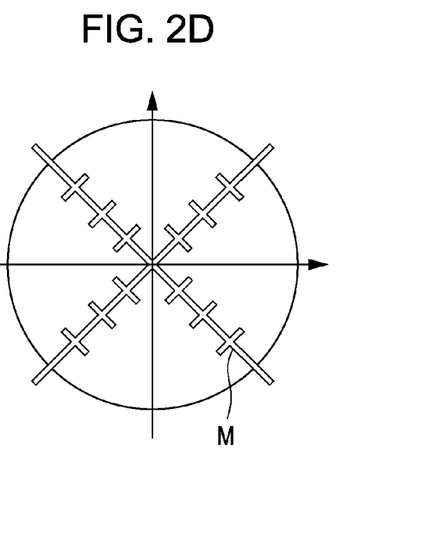

FIG. 2A shows the reference standard 16*b* having, as viewed in the incident direction of the measuring beam, a plurality of circular marks M. FIG. 2B shows the reference standard 16*b* having, as viewed in the incident direction of the measuring beam, a plurality of rectangular marks M. FIG. 2C shows the reference standard 16*b* having, as viewed in the incident direction of the measuring beam, concentric marks M. FIG. 2D shows the reference standard 16*b* having, as viewed in the incident direction of the measuring beam, a mark M including radial lines and other straight lines. As shown in FIGS. 2A to 2D, the marks M on the measurement surface may have any shape as long as their shapes can be identified on the measurement data, and the marks M may have, for example, circular shapes, rectangular shapes, or shapes including straight lines or curved lines. Furthermore, a plurality of different marks may be formed on the measurement surface of the reference standard.

The marks M are formed by grinding using a grinder or by removal and deposition using a focused ion beam. The marks M may have sharp edges or soft edges as long as their shapes and coordinates can be identified on the measurement data.

Figure 3:
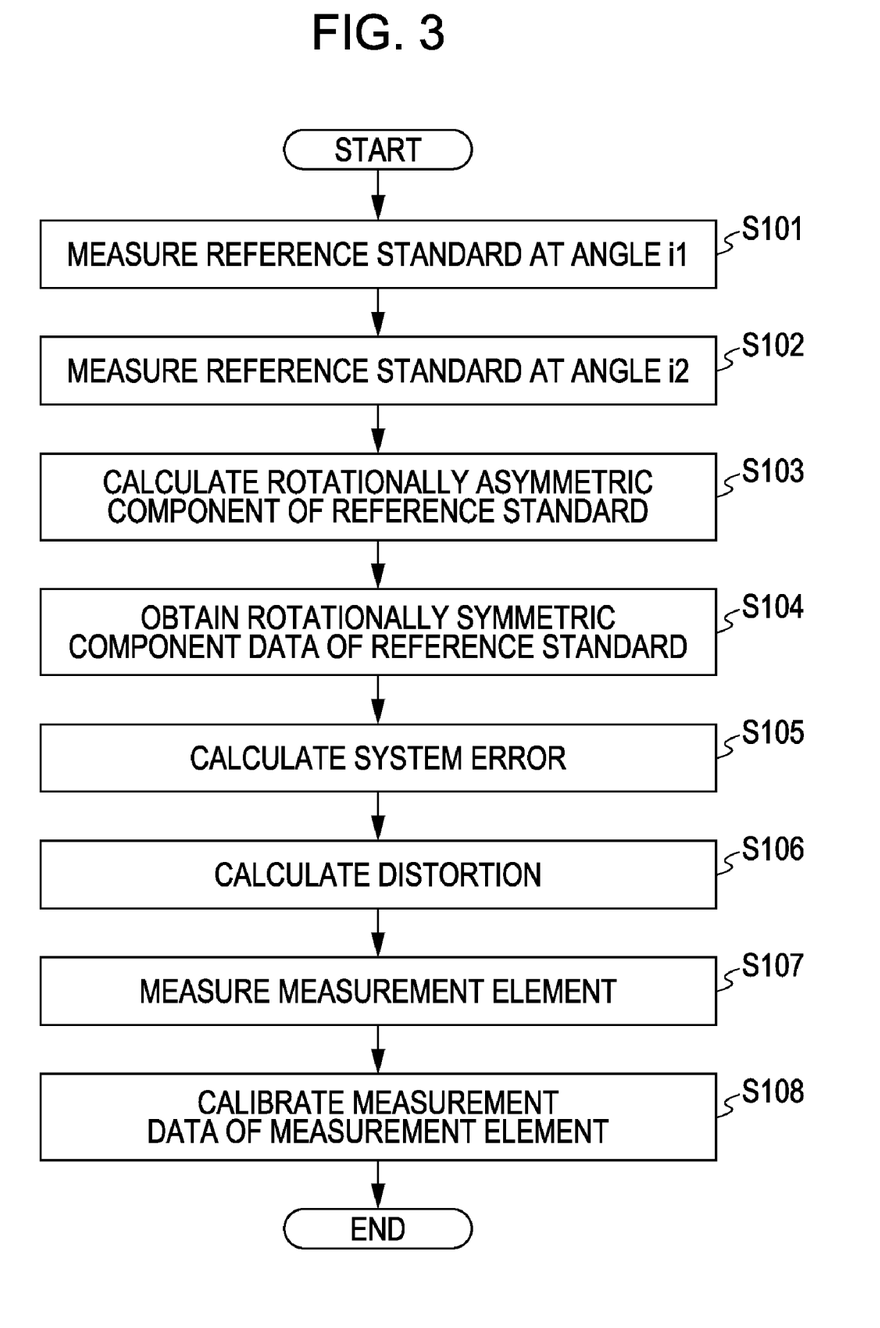
FIG. 3 is a flowchart showing steps of calibrating a measurement error.

Calibration of the measurement errors using the reference standard 16*b* will be described. FIG. 3 is a flowchart showing steps of calibrating the measurement error.

First, the reference standard 16*b* is disposed at a predetermined angle i1 about the optical axis of the reference standard 16*b* (interferometer) with respect to the optical element 15 having the reference surface and is measured (step S101: measure reference standard). The resulting measurement data MDi1 contains a rotationally symmetric component MDi1S and a rotationally asymmetric component MDi1A about the optical axis. That is, shape data Gi1 of the reference standard 16*b* is divided into a rotationally symmetric component GRS and a rotationally asymmetric component GRAi1 about the optical axis, and a system error S is also divided into a rotationally symmetric component SRS and a rotationally asymmetric component SRA about the optical axis. From the above, the measurement data MDi1 obtained when the reference standard 16*b* is disposed at the angle i1 is expressed as follows:

$$MDi1 = Gi1 + S = GRS + GRAi1 + SRS + SRA$$

Next, the reference standard 16*b* is disposed at an angle i2 (≠i1) about the optical axis of the reference standard 16*b* (interferometer) with respect to the optical element 15 and is measured (step S102: measure reference standard). The resulting measurement data MDi2 is, similarly to the data MDi1, expressed as follows:

$$MDi2 = Gi2 + S = GRS + GRAi2 + SRS + SRA$$

where Gi2 is the shape data of the reference standard 16*b* when the reference standard 16*b* is disposed at the angle i2 and GRAi2 is a rotationally asymmetric component about the optical axis of the shape data.

At this time, rotation of the reference standard 16*b* does not change the system error S and the rotationally symmetric component GRS of the shape data of the reference standard 16*b*. Therefore, the difference between the measurement data MDi1 and MDi2 is the amount by which the rotationally asymmetric component GRA of the data on the shape of the measurement surface of the reference standard 16*b* has changed. Therefore, as in the above-described Japanese Patent Laid-Open No. 2002-213930 (U.S. Patent Laid-Open No. 2004/36890), by measuring the reference standard (obtain the reference standard data) several times at predetermined angles while changing the rotation angle, it is possible to calculate only the rotationally asymmetric component GRA from the difference between the measurement data corresponding to the respective rotation angles (step S103). On the other hand, the data on the rotationally symmetric component GRS of the shape of the measurement surface of the reference standard 16*b* can be obtained by the measurement using a contact type measuring device or interferometer (step S104). Alternatively, as described in Japanese Patent Laid-Open No. 2002-213930 (U.S. Patent Laid-Open No. 2004/36890), an optical element, such as a zone plate, may be used for the measurement. Note that step S104 should be performed before step S105, which will be described below, and the rotationally symmetric component data of the shape of the reference standard 16*b* may be obtained by reading data measured in advance and stored in a storage unit.

By subtracting the thus-obtained rotationally asymmetric component GRA and rotationally symmetric component GRS of the shape data of the reference standard 16*b* from the measurement data, the system error S is calculated (step S105).

As described in Japanese Patent Laid-Open No. 2002-213930 (U.S. Patent Laid-Open No. 2004/36890), with the conventional reference standard (having no marks) having substantially the same shape as the measurement surface, only the measurement error in the direction normal to the measurement surface (system error) can be determined, and the measurement error in the direction tangent to the measurement surface (distortion) cannot be determined.

Figure 4:
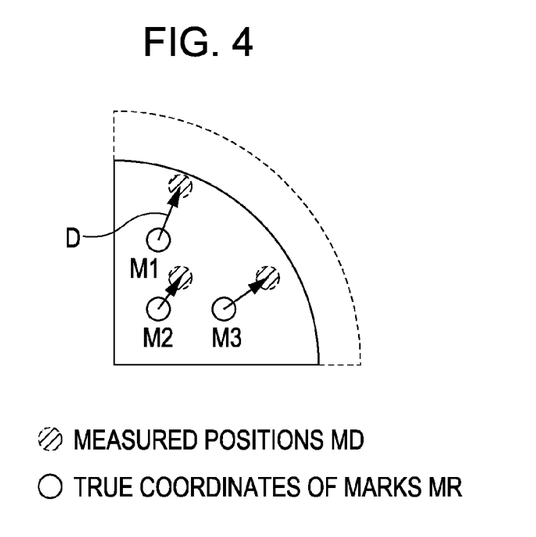
FIG. 4 is a diagram for explaining distortion.

However, in this embodiment, using the reference standard 16*b* with the marks M as shown in FIGS. 2A to 2D, distortion is calculated from the positional data of the marks M (step S106). To calculate distortion, the measurement data obtained in step S101 or step S102 is used. FIG. 4 is a diagram for explaining the distortion of the Fizeau interferometer. In the measurement in step S101 or step S102, the marks M of the reference standard 16*b* are measured at positions MD shifted from preliminarily specified true coordinates MR, due to the distortion of the interferometer. The difference in coordinate is the amount of distortion D. The coordinates (positions) of the marks M of the reference standard 16*b* may be calculated by calculating the barycenters of marks M1, M2, and M3 from the measurement data. Because the measured marks M themselves can be deformed due to distortion, the shape of the marks M on the measurement data and the true shape of the marks M may be fitted in advance. For example, the mark coordinates may be calculated after the shape of the marks M on the measurement data is corrected using the data on the measurement error due to distortion.

Then, the measurement surface of the measurement element 16a is measured (step S107: measure measurement element), and the resulting measurement data on the surface shape is calibrated with the system error S and the distortion D determined in steps S105 and S106 (step S108). In this manner, the data on the shape of the measurement surface of the measurement element 16a can be obtained. The distortion may be calibrated over the entire measurement surface by using the amount of distortion D as a function of the coordinate on the measurement surface and performing one-dimensional or two-dimensional fitting thereon. Step S107 should be performed before step S108.

If the size of the marks M in the direction normal to the measurement surface of the reference standard (normal directional shape) is too large with respect to the entire measurement surface, the rotationally symmetric component GRS changes in each of steps S101 and S102. This causes a calculation error of the rotationally asymmetric component GRA in step S103. Therefore, the marks M need to have a three-dimensional shape that does not significantly degrade the rotationally symmetric component GRS of the reference standard.

Because the normal directional shape of the marks M is measured as phase information in the interference measurement, if the phase becomes larger than ±½ of the wavelength of the measuring beam, it is difficult to uniquely determine the shape in the normal direction. Because the optical path of the measuring beam is twice as long as the distance between the reference surface and the measurement surface, it is desirable that the size of the marks M in the normal direction be smaller than ±¼ of the wavelength of the measuring beam with respect to the design shape of the measurement surface of the reference standard. For example, it is desirable that the size of the marks M in the normal direction be equal to or less than ±122 nm, where the wavelength of the measuring beam is 488 nm.

The size of the marks M in the in-plane direction of the measurement surface of the reference standard (in-plane directional shape) needs to be sufficiently larger than the size of one pixel in the data so that the marks M can be identified on the measurement data. If the size of the marks M is smaller than that of one pixel, the correct shape of the marks M may not be identified on the measurement data, depending on the positional relationship between the measurement surface and the image pick-up unit (CCD or the like). To ensure that the mark M is identified as one pixel, it is desirable that the size of the mark M in in-plane direction be set equal to or larger than a size of 1.5 pixels. Where Diam is the diameter of the measurement surface and NP is the number of pixels in the image pick-up unit, the length of one pixel PR is determined by PR=Diam/NP. The length of one pixel PR increases as the diameter of the measurement surface increases or as the number of pixels NP decreases.

In general, optical elements used in exposure apparatuses are designed to have a diameter in the range from about 100 mm to 300 mm. Let us assume that a measuring device has a 2000-pixel-square CCD camera as the image pick-up unit. If the entire measurement surface is measured with the CCD camera, the length of one pixel PR on the optical element is about 50 μm to 150 μm. Accordingly, the size of the marks M in the in-plane direction needs to be 225 μm or greater.

As described above, too large marks M are not desirable since they deteriorate the accuracy of the rotationally symmetric component and rotationally asymmetric component of the shape of the reference standard. Thus, the allowance of the processing size of the marks M was analyzed through simulation. Assuming that a rectangular mark is provided at a position distant from the center of the measurement surface by half the radius and using the area (dimension in the in-plane direction) and the processing depth (dimension in the normal direction) of the mark as parameters, to what extent the mark can be processed without degrading the shape of the measurement surface was analyzed.

Figure 5:
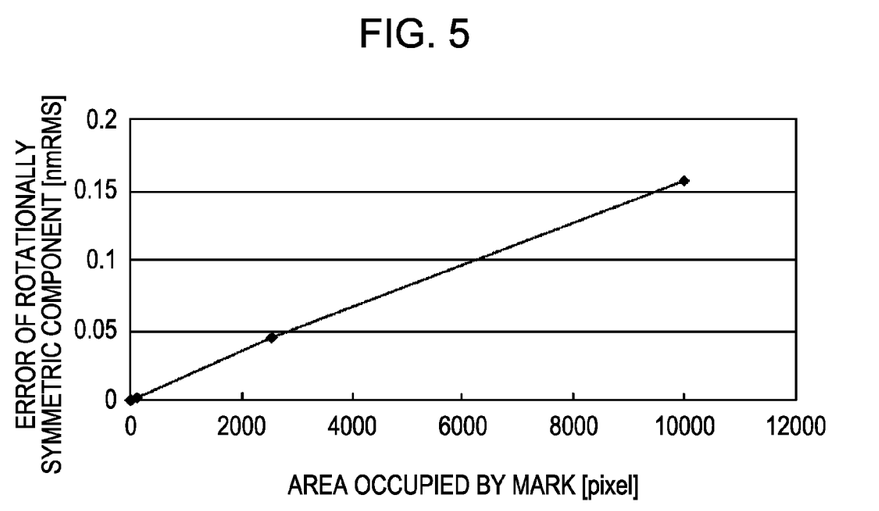
FIG. 5 is a graph showing the relationship between the area occupied by a mark and an error of the rotationally symmetric component.

FIG. 5 is a graph showing the area occupied by the mark with respect to the measurement surface and the error of the rotationally symmetric component GRS of the shape of the measurement surface. As can be seen from the graph, the area occupied by the marks and the error of the rotationally symmetric component change substantially linearly. It is desirable that, when the dimension of the mark in the normal direction is 10 nm, the sum of the areas occupied by the marks in the measurement surface be equal to or less than 6000 pixels. This means that sixty 10-pixel-square marks can be disposed on the surface.

As has been described, according to this embodiment, the system error and distortion of the measuring device can be calculated using a single reference standard. Moreover, the measurement errors (system error and distortion) of the interferometer can be calibrated and the shape of the measurement surface can be accurately measured using fewer reference standards.

Second Embodiment

Figure 6:
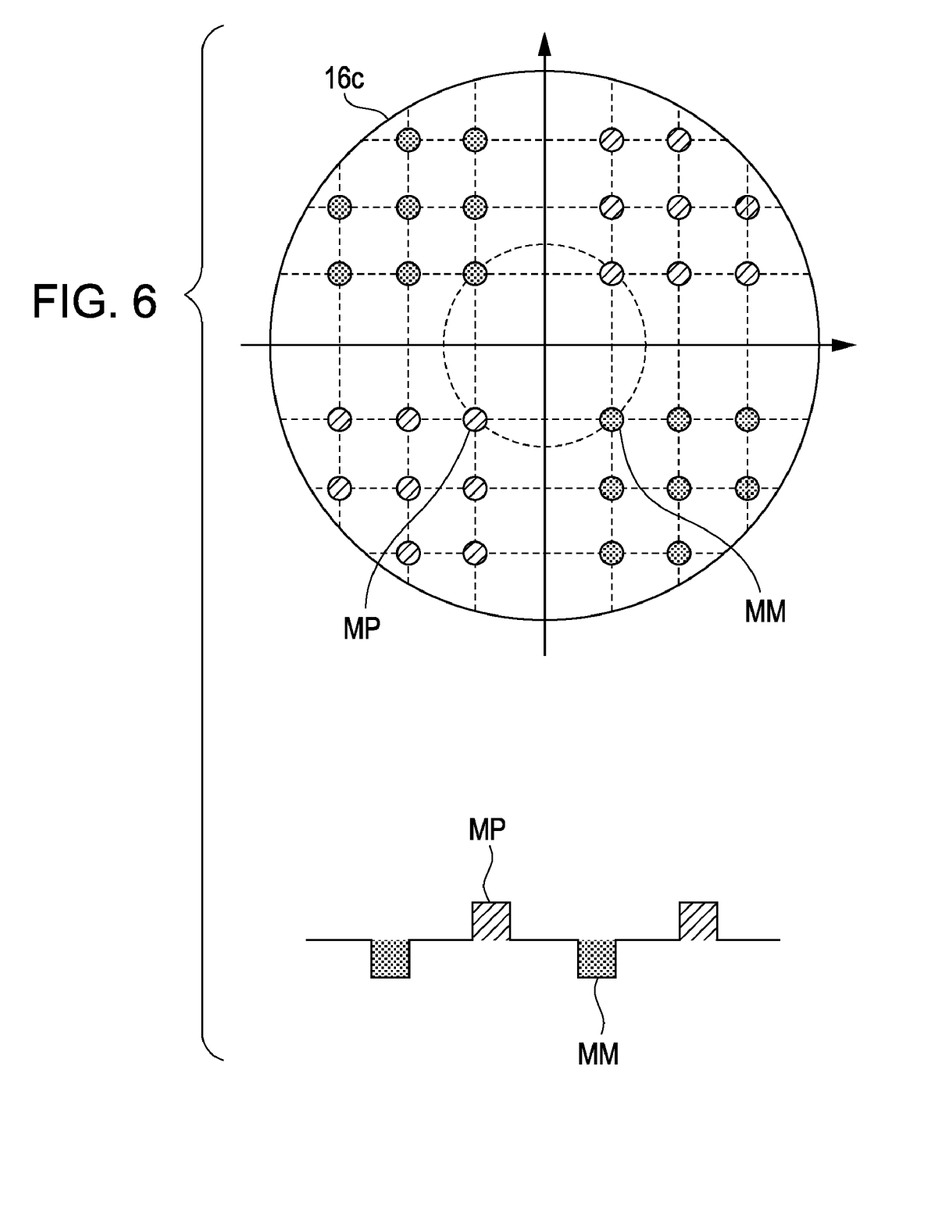
FIG. 6 is a diagram showing a reference standard according to a second embodiment.

A second embodiment of the invention will be described below. The structure of the interferometer 1 is the same as that according to the first embodiment, except for the reference standard. FIG. 6 shows a reference standard 16c according to this embodiment. The reference standard 16c has at least two types of marks MM and MP on the measurement surface. The marks MP are protruding marks protruding in the direction normal to the measurement surface of the reference standard 16c, i.e., in the direction from the reference standard 16c toward the reference surface. The marks MM are recessed marks recessed in the direction normal to the measurement surface of the reference standard 16c, i.e., in the direction from the reference surface toward the reference standard 16c. Although the reference standard 16c has several marks MP and several marks MM as shown in FIG. 6, it may have at least one mark MP and one mark MM.

Assuming that there is an arbitrary circle on the measurement surface centered at the point on the optical axis of the reference standard 16c, at least one protruding mark MP and one recessed mark MM are provided on the circumference of the circle. The dimensions and arrangement of the protruding mark MP and the recessed mark MM are designed such that the integrated value of the height of the protruding marks MP on the circumference of the circle is equal to the integrated value of the depth of the recessed marks MM on the circumference of the circle. The height and depth of the marks MP and MM are both dimensions in the direction normal to the measurement surface.

The marks MP and MM may be formed either by grinding using a grinder or by removal and deposition using a focused ion beam. In particular, the protruding marks MP may be formed in a protruding shape either by removing the entire measurement surface except for the mark portions or by performing deposition using a focused ion beam.

When the reference standard 16c is used, the rotation of the reference standard 16c about the optical axis of the measurement surface hardly changes the rotationally symmetric component of the shape of the measurement surface because of rotational averaging. That is, because the degradation in the rotationally symmetric component of the shape of the measurement surface due to the marks MP and MM is reduced in steps S101 and S102 in the first embodiment, a design restriction on the three-dimensional shape of the marks formed on the reference standard is eased.

However, a processing error of the marks MP and MM in the measurement surface may cause an error of the rotationally symmetric component of the shape of the measurement surface. That is, the positions of the marks MP and MM in the in-plane direction can shift with respect to the rotation about the optical axis of the measurement surface. Thus, the allowance of the shift of the marks in the in-plane direction due to processing was analyzed through simulation.

Figure 7:
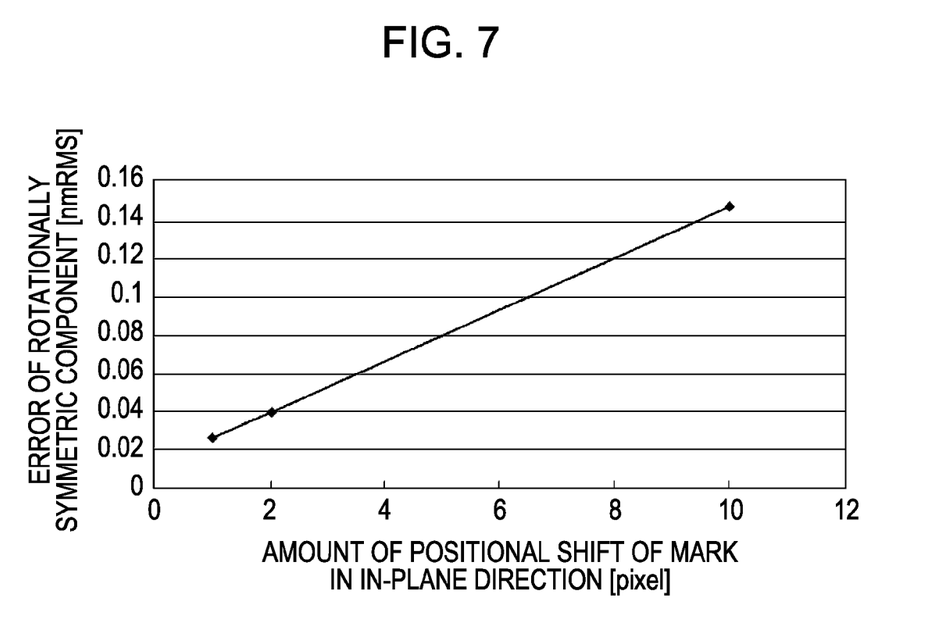
FIG. 7 is a graph showing the relationship between the amount of positional shift of the mark in an in-plane direction and the error of the rotationally symmetric component.

FIG. 7 is a graph showing the relationship between the amount of positional shift of the mark in the in-plane direction and the error of the rotationally symmetric component GRS of the shape of the measurement surface. The amount of positional shift of the mark in the in-plane direction and the error of the rotationally symmetric component change substantially linearly. When the allowance of the error of the rotationally symmetric component is assumed to be 1 nmRMS, a positional shift of the mark by about 60 pixels in the in-plane direction causes no problem.

According to this embodiment, by using the reference standard 16c, the measurement errors (system error and distortion) of the measuring device can be more accurately calculated.

When at least one mark is provided on the measurement surface of the reference standard 16c and the integrated value of the dimension of the mark in the direction normal to the measurement surface, on the circumference of the assumed circle, is known, the same advantages can be obtained. That is, by providing the interferometer 1 with a storage unit, such as a memory, storing the integrated value and by reading the data on the integrated value from the storage unit, the measurement errors of the interferometer can be calculated. Furthermore, the measurement surface of the reference standard 16c may have at least one protruding mark and one recessed mark that are formed at regular intervals on the circumference of the assumed circle. For example, in FIG. 6, the protruding marks and the recessed marks are formed alternately at 90-degree intervals.

Third Embodiment

Figure 8:
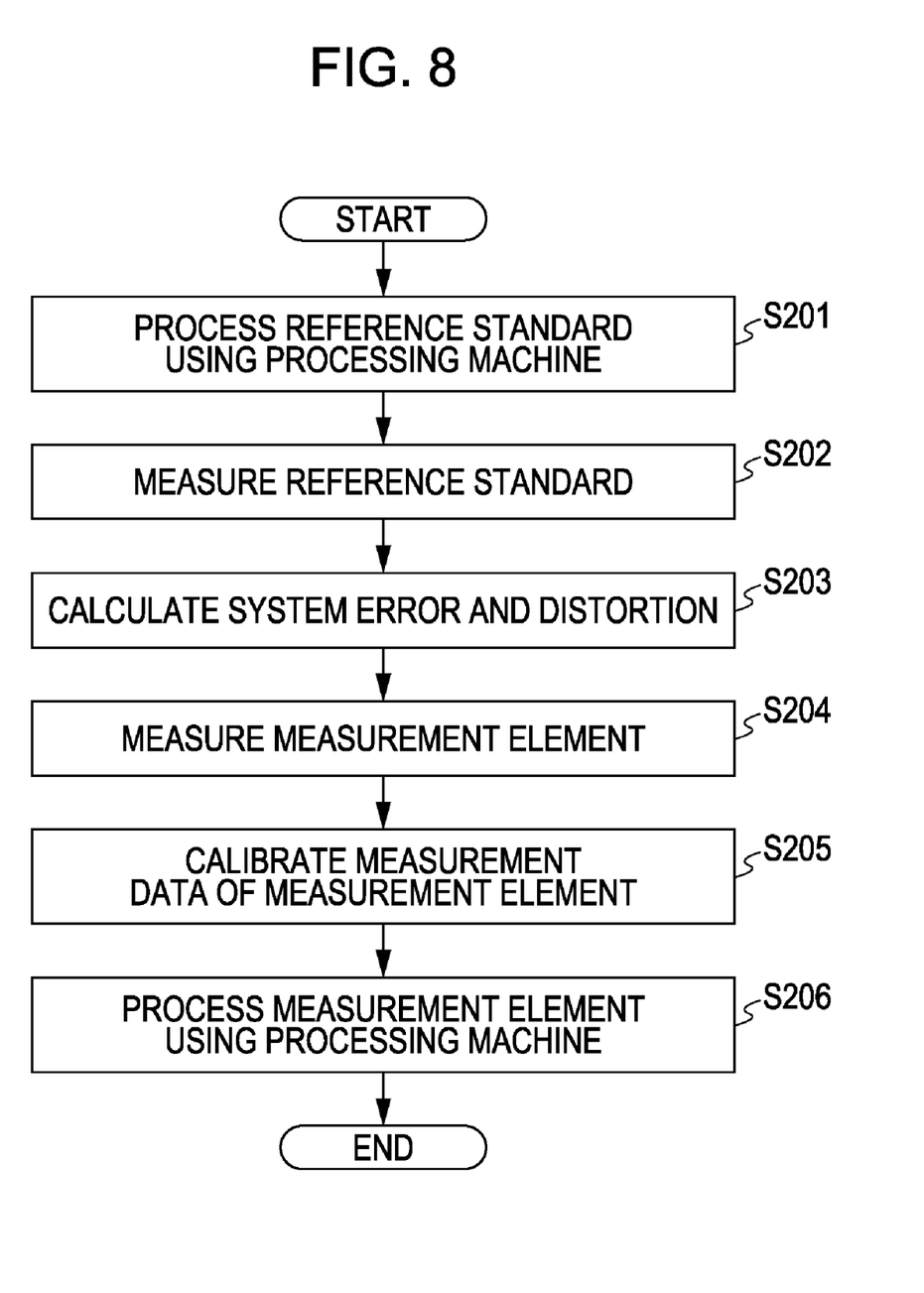
FIG. 8 is a flowchart showing steps of processing a measurement element according to a third embodiment.

A third embodiment of the invention will be described below. In this embodiment, an optical element is manufactured by processing the measurement surface of the optical element using the data on the shape of the measurement surface of the optical element measured in the above-described embodiments. FIG. 8 shows steps of processing the measurement surface.

First, a reference standard is processed by a processing machine and marks described in the first and second embodiments are formed on the measurement surface of the reference standard (step S201). Depending on the required accuracy and size, the processing machine may be either a grinder or a processing machine for performing removal and deposition using a focused ion beam. The processing machine has in itself a coordinate reference to be used when the marks are formed on the measurement surface of the reference standard.

Then, as in steps S101 and S102 in FIG. 4, the measurement surface of the reference standard is measured at a plurality of rotation angles (step S202). Next, as described above, the system error and distortion of the measuring device are calculated (step S203). Then, the surface shape of the measurement element is measured (step S204), and the measurement data obtained in step S204 is calibrated with the measurement errors calculated in step S203 (step S205). Thus, the data on the surface shape of the measurement element is obtained.

Then, using the thus-obtained surface shape data of the measurement element, correction processing is performed on the measurement surface of the measurement element, at a portion which needs to be processed, in the in-plane direction (step S206). Because the measurement element and the reference standard have substantially the same shape except for the marks, when correction processing is performed on the measurement element on the basis of the measurement result, the coordinate at which the correction processing is performed can be determined with reference to the coordinate in the processing machine. Accordingly, more accurate processing can be performed.

Although, in the above-described embodiments, the explanations are given taking the Fizeau interferometer as an example, the invention is not limited thereto and does not exclude application to other known interferometers.

A program for causing a computer to execute the method for measuring the measurement surface and the method for processing the measurement surface according to the above-described embodiments of the present invention also constitute an aspect of the invention. Furthermore, such a program can be stored in a storage medium readable by a computer.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-224650 filed on Sep. 2, 2008, which is hereby incorporated by reference herein in its entirety.

What is claimed is:

1. A method for measuring the shape of a measurement surface using a measuring device for measuring the shape of the measurement surface utilizing interference between light from the measurement surface and light from a reference surface, the method comprising:

a step of obtaining data on a rotationally symmetric component of the shape of a measurement surface of a reference standard having a mark;

a reference standard measuring step of measuring the measurement surface of the reference standard several times at different rotation angles about the optical axis of the reference standard by the measuring device;

a calculation step of calculating a measurement error of the measuring device in a direction normal to the measurement surface by calculating a rotationally asymmetric component of the shape of the measurement surface of the reference standard using the measurement data corresponding to the respective rotation angles obtained in the reference standard measuring step and by subtracting the rotationally symmetric component and the rotationally asymmetric component from the measurement data corresponding to the respective rotation angles;

a calculation step of calculating a measurement error of the measuring device in a direction tangent to the measurement surface using data on the position of the mark contained in the measurement data corresponding to the respective rotation angles obtained in the reference standard measuring step;

a measurement object measuring step of measuring a measurement surface of a measurement object by the measuring device; and a step of calibrating the measurement data of the measurement surface of the measurement object obtained in the measurement object measuring step using the measurement errors calculated in the calculation steps.

2. A method for measuring the shape of a measurement surface using a measuring device for measuring the shape of the measurement surface utilizing interference between light from the measurement surface and light from a reference surface, the method comprising:

a step of obtaining data on a rotationally symmetric component of the shape of a measurement surface of a reference standard having a mark;

a reference standard data obtaining step of obtaining measurement data obtained by measuring the measurement surface of the reference standard several times at different rotation angles about the optical axis of the reference standard by the measuring device;

a calculation step of calculating a measurement error of the measuring device in a direction normal to the measurement surface by calculating a rotationally asymmetric component of the shape of the measurement surface of the reference standard using the measurement data corresponding to the respective rotation angles obtained in the reference standard data obtaining step and by subtracting the rotationally symmetric component and the rotationally asymmetric component from the measurement data corresponding to the respective rotation angles;

a calculation step of calculating a measurement error of the measuring device in a direction tangent to the measurement surface using data on the position of the mark contained in the measurement data corresponding to the respective rotation angles obtained in the reference standard data obtaining step; and a step of calibrating measurement data of a measurement surface of a measurement object measured by the measuring device using the measurement errors calculated in the calculation steps.

3. The method according to claim 1,
wherein the measurement surface of the measurement object is an aspherical surface that is rotationally symmetric about the optical axis of the measurement object.

4. The method according to claim 2,
wherein the measurement surface of the measurement object is an aspherical surface that is rotationally symmetric about the optical axis of the measurement object.

5. A method for manufacturing an optical element, the method comprising:

a measuring step of measuring the shape of a measurement surface of the optical element serving as a measurement object using the measuring method according to claim 1; and a processing step of processing the measurement surface of the optical element using a processing device used to process the measurement surface of the reference standard, on the basis of the result of the measurement in the measuring step.

6. A method for manufacturing an optical element, the method comprising:

a measuring step of measuring the shape of a measurement surface of the optical element serving as a measurement object using the measuring method according to claim 2; and a processing step of processing the measurement surface of the optical element using a processing device used to process the measurement surface of the reference standard, on the basis of the result of the measurement in the measuring step.

* * * * *